United States Patent
Tsai et al.

(10) Patent No.: US 9,613,409 B1
(45) Date of Patent: Apr. 4, 2017

(54) IMAGE CONVERTING METHOD AND RELATED IMAGE CONVERTING MODULE

(71) Applicant: NOVATEK Microelectronics Corp., Hsin-Chu (TW)

(72) Inventors: Wan-Ching Tsai, Taipei (TW); Chao-Wei Ho, Hsinchu County (TW); Chia-Jung Hsu, Changhua County (TW); Chih-Chia Kuo, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 15/012,871

(22) Filed: Feb. 2, 2016

(51) Int. Cl.
*G09G 5/02* (2006.01)
*G06T 5/00* (2006.01)
*G09G 3/34* (2006.01)

(52) U.S. Cl.
CPC .......... *G06T 5/009* (2013.01); *G09G 3/3406* (2013.01); *G06T 2207/20208* (2013.01); *G09G 2320/0626* (2013.01)

(58) Field of Classification Search
CPC ..... G06T 15/503; G06T 15/506; G06T 5/007; H04N 1/6005
See application file for complete search history.

(56) References Cited

U.S. PATENT DOCUMENTS

| 7,612,804 | B1* | 11/2009 | Marcu | G06T 5/50 348/222.1 |
| 2010/0271512 | A1* | 10/2010 | Garten | G09G 5/06 348/239 |
| 2013/0076947 | A1* | 3/2013 | Hirakawa | H04N 9/04 348/273 |
| 2014/0307960 | A1* | 10/2014 | Sharma | H04N 5/23229 382/162 |
| 2015/0356904 | A1* | 12/2015 | Nakatani | G09G 5/377 345/690 |

* cited by examiner

Primary Examiner — Phi Hoang
(74) Attorney, Agent, or Firm — Winston Hsu; Scott Margo (57) ABSTRACT

An image converting method includes calculating a plurality of segment averages of pixel values in a plurality segments of an input image; acquiring the maximum among the segment averages as a first threshold; calculating a plurality of local averages of pixel values in adjacent segments of input image; acquiring the maximum among local averages as a second threshold; counting the number of pixel values exceeding first threshold in the segments as a plurality of first pixel counts and counting the number of pixel values exceeding second threshold in the segments as a plurality of second pixel counts; generating a specular map and a confidence according to the first pixel counts and the second pixel counts; mapping the input image according to the specular map, to generate an intermediate image; and blending the input image and the intermediate image according to the confidence, to generate an output image.

9 Claims, 6 Drawing Sheets

IMAGE CONVERTING METHOD AND RELATED IMAGE CONVERTING MODULE

BACKGROUND OF THE INVENTION

1. Field of the Invention

The present invention relates to an image converting method and related image converting module, and more particularly, to an image converting method capable of converting a low dynamic range image to a high dynamic range image and related image converting module.

2. Description of the Prior Art

The dynamic range of a scene is defined to be a ratio of the highest scene luminance to the lowest scene luminance. Generally speaking, a conventional display device such as a liquid crystal display (LCD) or a television has a dynamic range of about 250:1, and covers about half of the visible color gamut. However, the human vision system (HVS) has a dynamic range greater than 10,000:1, and is capable of distinguishing about 10,000 colors at a given brightness.

Typically, the image displayed on the conventional display device corresponds to intensities spanning 256 gray levels. That is, each color channel (red, green, and blue) is determined by 8 bits. Therefore, the minimum gray level is equal to 0, and the maximum gray level is equal to 255. From the above description, it is obvious that the dynamic range in the real-world environment far exceeds the representable dynamic range shown on the conventional display device.

In recent years, a high-end display device may feature high dynamic range (HDR), to expand its contrast ratio and to display more realistic, natural images. Although the high-end display device is able to display the HDR images, most of image contents are still stored by the conventional format (e.g. low dynamic range (LDR) images). Thus, how to convert the LDR images to the HDR images capable of being displayed by the display device of HDR becomes a topic to be discussed.

SUMMARY OF THE INVENTION

In order to solve the above problems, the present invention discloses an image converting method capable of converting a low dynamic range image to a high dynamic range image and related image converting module.

In an aspect, the present invention discloses an image converting method for a display device. The image converting method comprises calculating a plurality of segment averages of pixel values in a plurality segments of an input image of a low dynamic range of luminance; acquiring the maximum among the plurality of segment averages as a first threshold; calculating a plurality of local averages of pixel values in adjacent segments of the input image; acquiring the maximum among the plurality of local averages as a second threshold; counting the number of pixel values exceeding the first threshold in the plurality of segments as a plurality of first pixel counts and counting the number of pixel values exceeding the second threshold in the plurality of segments as a plurality of second pixel counts; generating a specular map and a confidence according to the plurality of first pixel counts and the plurality of second pixel counts; mapping the input image according to the specular map, to generate an intermediate image of a high dynamic range of luminance; and blending the input image and the intermediate image according to the confidence, to generate an output image. The ratio between the input image and the intermediate image is determined by the confidence.

In another aspect, the present invention discloses an image converting module for a display device. The image converting module comprises a metering unit, a detecting unit, a mapping unit, and a blending unit. The metering unit is utilized to calculate a plurality of segment averages of pixel values in a plurality segments of the input image, calculate a plurality of local averages of pixel values in adjacent segments of the input image, count the number of pixel values exceeding a first threshold in the plurality of segments as a plurality of first pixel counts, and count the number of pixel values exceeding a second threshold in the plurality of segments as a plurality of second pixel counts. The detecting unit is utilized to acquire the maximum among the plurality of segment averages as a first threshold, acquire the maximum among the plurality of local averages as a second threshold, generate a control signal to the metering unit to instruct the first threshold and the second threshold, generate a specular map and a confidence according to the plurality of first pixel counts and the plurality of second pixel counts. The mapping unit is utilized to map the input image according to the specular map, to generate an intermediate image. The blending unit is utilized to blend the input image and the intermediate image according to the confidence, to generate an output image, wherein the ratio between the input image and the intermediate image is determined by the confidence.

Because the information of the input image of the low dynamic range of luminance is acquired by analyzing segments rather than pixels of the input image, the computing cost of the image converting module is reduced. The power efficiency of the image converting module is improved and manufacturing cost of the image converting module is decreased, therefore.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
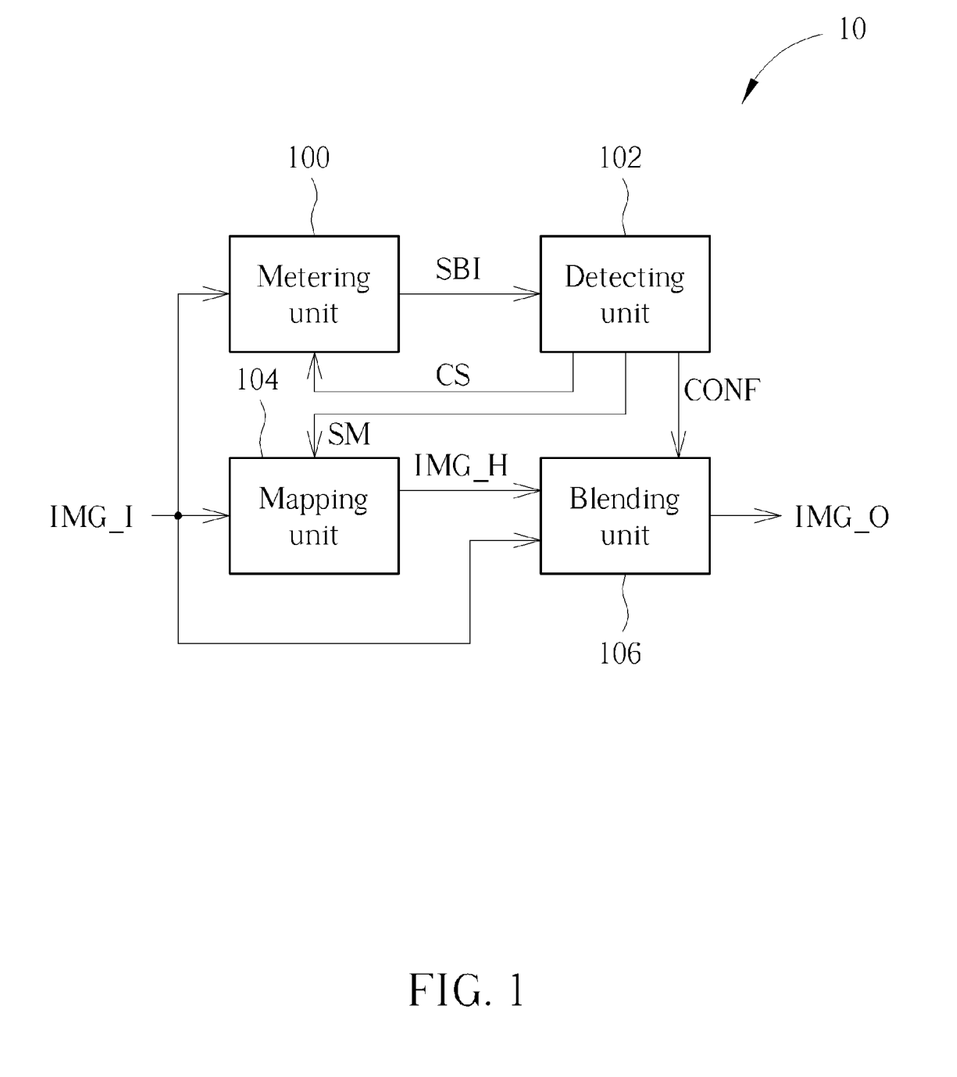
FIG. 1 is a schematic diagram of an image converting module according to an example of the present invention.

Please refer to FIG. 1, which is a schematic diagram of an image converting module 10 according to an example of the present invention. The image converting module 10 may be utilized in a display device such as a liquid crystal display (LCD), a tablet, or a television, and is not limited herein. As shown in FIG. 1, the image converting module 10 comprises a metering unit 100, a detecting unit 102, a mapping unit 104, and a blending unit 106. The metering unit 100 is utilized to determine segment based information SBI of a plurality of segments in an input image IMG_I, which has a low dynamic range (LDR) of luminance or brightness, according to a control signal CS. Based on the segment based information SBI, the detecting unit 102 generates the control signal CS to the metering unit 100, generates a specular map SM to the mapping unit 104, and generates a confidence CONF to the blending unit 106. The mapping unit 104 is utilized to select mapping curves according to the specular map SM and accordingly map pixel data of the input image IMG_I of the low dynamic range to an intermediate image IMG_H of high dynamic range (HDR) of luminance or brightness. The blending unit 106 is utilized to blend the input image IMG_I of the low dynamic range and the intermediate image IMG_H of the high dynamic range according to the confidence CONF, to generate an output image IMG_O capable of being displayed by the display device featuring with high dynamic range of luminance or brightness. In this example, the metering unit 100 analyzes the input image IMG_I based on the information of each segment (i.e. segment based information SBI) rather than each pixel in the input image IMG_I. The computing cost of converting the input image IMG_I with low dynamic range to the output image IMG_O with high dynamic range is reduced, therefore, so as to improve power efficiency and reduce manufacturing cost of the image converting module 10.

Figure 2:
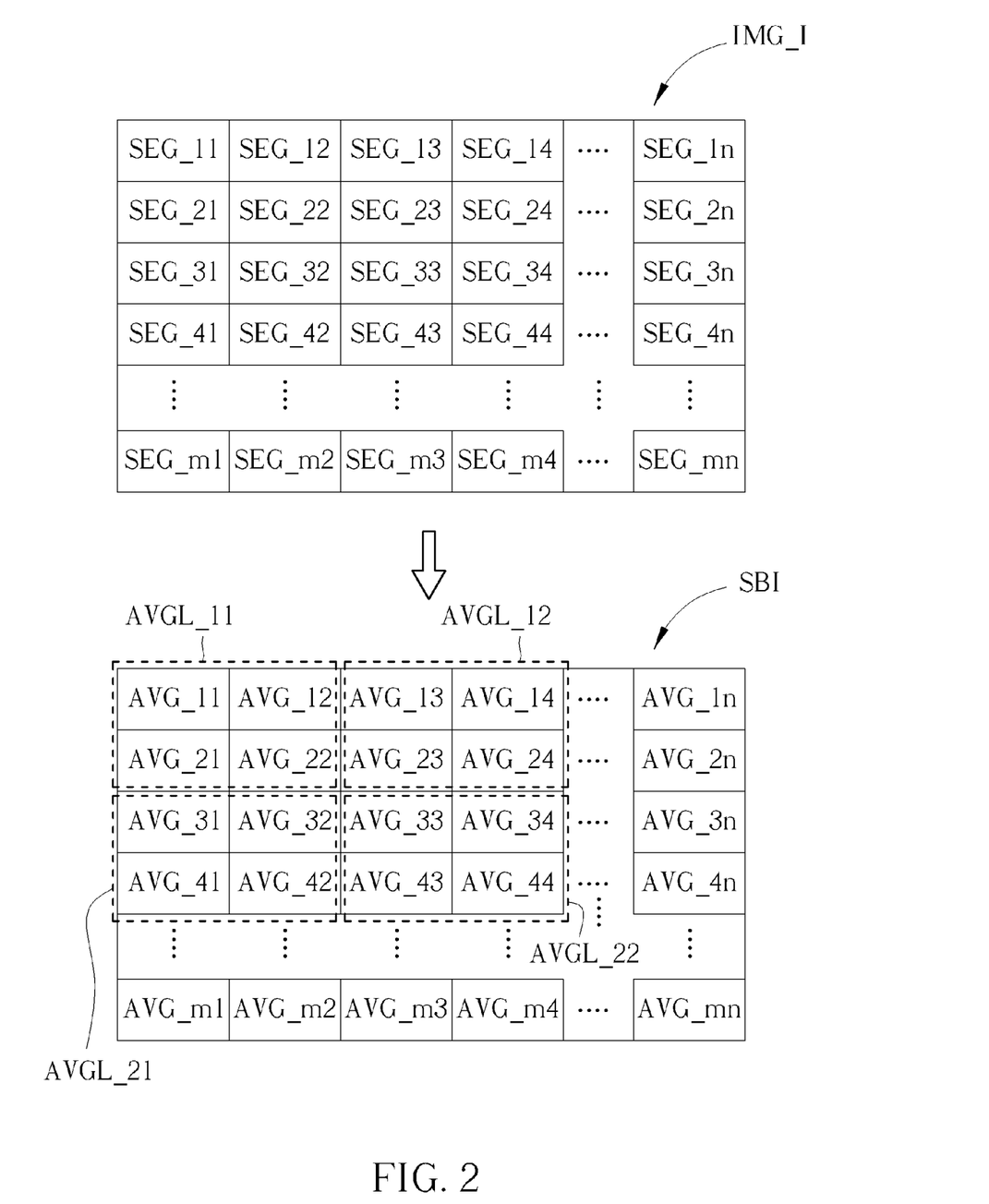
FIG. 2 is a schematic diagram of related signals of the image converting module shown in FIG. 1.

Please refer to FIG. 2, which is a schematic diagram of related signals of the image converting module 10 shown in FIG. 1. As shown in FIG. 2, the metering unit 100 divides the input image IMG_I into a plurality of segments SEG_11-SEG_mn forming an m*n matrix, wherein each of segments SEG_11-SEG_mn comprises multiple pixels of the input image IMG_I. In an example, m and n are 24 and 12, respectively. Next, the metering unit 100 calculates segment averages AVG_11-AVG_mn of pixel values (e.g. luminance or brightness) in the segments SEG_11-SEG_mn, respectively, and indicates the segment averages AVG_11-AVG_mn to the detecting unit 102 via the segment based information SBI. The detecting unit 102 acquires the maximum value among the segment averages AVG_11-AVG_mn as a threshold TH_HI. In other words, the threshold TH_H1 is the average pixel value of the lightest segment among the segments SEG_11-SEG_mn. In addition, the detecting unit 102 calculates averages of multiple neighborhood/adjacent averages among the segment averages AVG_11-AVG_mn as local averages AVGL_11-AVGL_hk, and acquires the maximum value among the local averages AVGL_11-AVGL_hk as a threshold TH_LO. In an example, the detecting unit 102 calculates the average of segment averages AVG_11, AVG_12, AVG_21, and AVG_22 as the local average AVGL_11 (i.e. AVGL_11=(AVG_11+AVG_12+AVG_21+AVG_22)/4), calculates the average of segment averages AVG_31, AVG_32, AVG_41, and AVG_42 as the local average AVGL_21, and so on. That is, the detecting unit 102 averages the pixel values of every 4 segments that form a 2*2 matrix among the segments SEG_11-SEG_mn as the local averages AVGL_11-AVGL_hk. Under such a condition, h becomes m/2 and k becomes N/2. Note that, the number of neighborhood/adjacent segments for calculating each of the local averages AVGL_11-AVGL_hk may be altered according to different applications and design concepts. Because the local averages AVGL_11-AVGL_hk are acquired by averaging the multiple neighborhood/adjacent segment averages among the segment averages AVG_11-AVG_mn, the threshold TH_LO (i.e. the maximum value among the local averages AVGL_11-AVGL_hk) is smaller than the threshold TH_HI (i.e. the maximum value among the segment averages AVG_11-AVG_mn) and the threshold TH_LO is closer to the average pixel value of the input image IMG_I than the threshold TH_HI does.

After acquiring the thresholds TH_HI and TH_LO, the detecting unit 102 transmits the control signal CS to the metering unit 100 to indicate the thresholds TH_HI and TH_LO. The metering unit 100 counts the number of pixel values exceeding the threshold TH_HI in each of segments SEG_11-SEG_mn to acquire pixel counts PC_HI_11-PC_HI_mn and counts the number of pixel values exceeding the threshold TH_LO in each of segments SEG_11-SEG_mn to acquire pixel counts PC_LO_11-PC_LO_mn. Via appropriately setting the thresholds TH_HI and TH_Lo, the metering unit 100 uses a simple method to acquire the pixel counts PC_HI_11-PC_HI_mn and PC_LO_11-PC_LO_mn as references of determining the brightness information of segments SEG_11-SEG_mn. The detecting unit 102 receives the pixel counts PC_HI_11-PC_HI_mn and PC_LO_11-PC_LO_mn from the metering unit 100 and accordingly generates specular values SM_11-SM_mn of the specular map SM. The specular values SM_11-SM_mn are corresponding to the segments SEG_11-SEG_mn, respectively, and positively correlate to the pixel counts PC_HI_11-PC_HI_mn and PC_LO_11-PC_LO_mn. In an example, the equations of generating specular values SM_11-SM_mn can be expressed as:

$$SM\_ij\_tmp=(PC\_HI\_ij+PC\_LO\_ij)\times(PC\_HI\_ij+1),$$
$$i\leq m, j\leq n \qquad (1)$$

$$SM\_ij=MIN(SM\_ij\_tmp\times SPE\_SLOP, SM\_MAX),$$
$$i\leq m, j\leq n \qquad (2)$$

Figure 3:
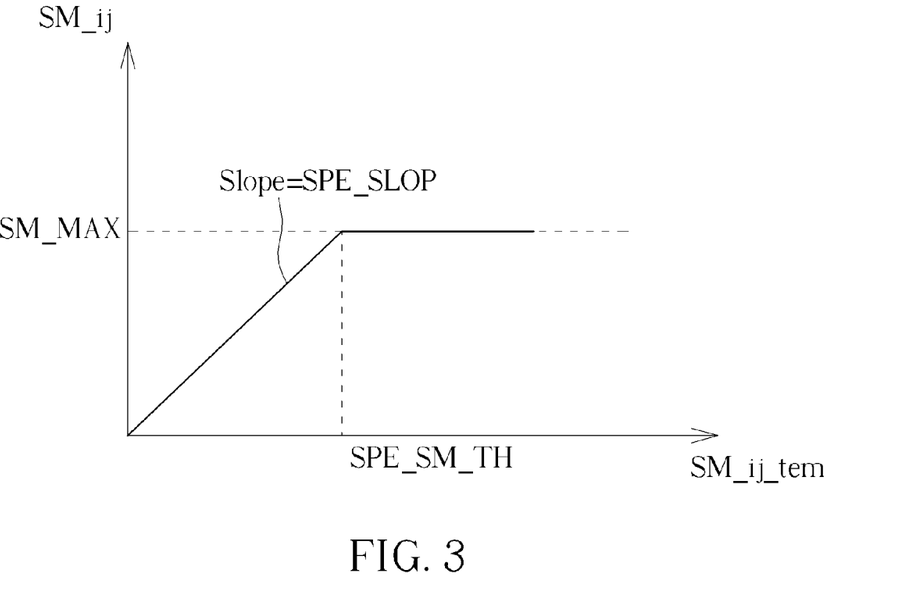
FIG. 3 is a schematic diagram of relationships between related signals of the image converting module shown in FIG. 1.

In the equations (1) and (2), SM_ij_tmp is proportional to the pixel counts PC_HI_ij and PC_LO_ij, and SPE_SLOP is utilized for adjusting the relation between SM_ij_tmp and the specular values SM_ij. Please refer to FIG. 3, which is a schematic diagram of relationships between SM_ij_tmp and specular value SM_ij. As shown in FIG. 3, before reaching a value SM_max, the specular value SM_ij increases with SM_ij_tmp in the slope of SPE_slop. After reaching the value SM_max, the specular value SM_ij keeps at the value SPE_max. According to the equations (1) and (2), the detecting unit 102 generates the specular values SM_11-SM_ij corresponding to the segments SEG_11-SEG_mn.

Next, the mapping unit 104 selects the mapping curve of each of pixel values in the input image IMG_I according to the specular map SM. In an example, the mapping unit 104 converts the specular map SM of segment base into a specular map SM_PIX of pixel base by interpolating the specular values SM_11-SM_mn according to the relationships among the segments SM_11-SM_mn. According to the specular map SM_PIX of pixel base, the mapping unit 104 determines mapping curve utilizing for adjusting (e.g. mapping) each pixel value of the input image IMG_I and performs the adjusting process to generate an intermediate image IMG_H of the high dynamic range. For example, the mapping unit 104 may interpolate 16 mapping curves according to the each specular value in the specular map SM_PIX. In an example, the ranges of specular values in the specular map SM_PIX are 0-1023 (i.e. SM_MAX=1023)

and 16 mapping curves are corresponding to 0, 63, 127, . . . , 959, respectively. The mapping curve corresponding to the specular value greater than 959 is $16^{th}$ mapping curve and the mapping curve corresponding to the specular value smaller than 959 is acquired by interpolating $1^{st}$ to $15^{th}$ mapping curves according to its value. Note that, the method of interpolating mapping curves or the number of mapping curves may vary according to different applications and design concepts, and are not limited herein.

After the intermediate image IMG_H of the high dynamic range is generated, the blending unit 106 blends the image IMG_I of the low dynamic range with the intermediate image IMG_H of the high dynamic range to generate the output image IMG_O of the high dynamic range, wherein the ratio between the input image IMG_I and the intermediate image IMG_H is determined by the confidence CONF. When the bright area in the input image IMG_I is greater, the image IMG_I is less needed to be highlighted. Thus, the ratio of intermediate image IMG_H to the image IMG_I decreases when the bright area in the input image IMG_I increases. That is, the confidence CONF and the bright area in the input image IMG_I are negative correlated. In an example, the detecting unit 102 counts a number of relative bright segments among the segments SEG_11-SEG_mn to determine the bright area in the input image IMG_I. The detecting unit 102 may determine whether a segment is relative bright based on the pixel counts PC_HI_11-PC_HI_mn and PC_LO_11-PC_LO_mn. In an example, the equations of generating the confidence CONF can be expressed as:

$$PC\_S\_ij = PC\_HI\_ij + PC\_LO\_ij, i \leq m, j \leq n \quad (3)$$

$$SPE\_RA = \frac{\text{number of } PC\_S\_11 - PC\_S\_mn > TH\_CONF\_PIX}{\text{number of } SEG\_11 - SEG\_mn} \quad (4)$$

$$CONF = \quad (5)$$
$$\begin{cases} C\_MAX, & SPE\_RA \leq TH\_RA \\ C\_MAX - MIN((SPE\_RA - TH\_RA) \times SPE\_RA\_Slop, C\_MAX), \\ & SPE\_RA > TH\_RA \end{cases}$$

Figure 4:
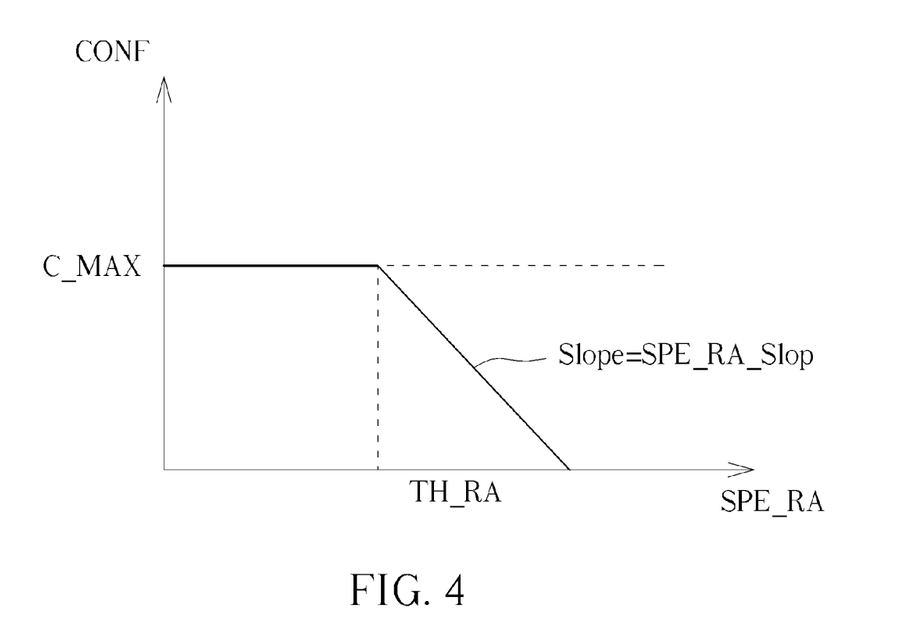
FIG. 4 is a schematic diagram of relationships between related signals of the image converting module shown in FIG. 1.

According to the equations (3)-(5), the detecting unit 102 calculates sums PC_S_11-PC_S_mn of the segments SEG_11-SEG_mn by respectively adding the pixel counts PC_HI_11-PC_HI_mn and PC_LO_11-PC_LO_mn, acquires a value SPE_RA by dividing the number of sums that are greater than a threshold TH_S (i.e. the number of bright segments) by the number of segments SEG_11-SEG_mn, and generates the confidence CONF according to the value SPE_RA. Please refer to FIG. 4, which is a schematic diagram of the relationship between the value SPE_RA and the confidence CONF. According to FIG. 4 and equation (5), the confidence CONF keeps at a maximum confidence C_MAX to maximize the ratio of the intermediate image IMG_H to the image IMG_I for generating the output image IMG_O when the value SPE_RA is not greater than a threshold TH_RA; and the ratio of the intermediate image IMG_H to the image IMG_I when generating the output image IMG_O decreases with the value SPE_RA when the value SPE_RA is greater than the threshold TH_RA, wherein the minimum value of confidence CONF is 0. In other words, the ratio of the intermediate image IMG_H to the image IMG_I for generating the output image IMG_O is inverse proportional to the number of bright segments in the input image IMG_I. In this example, the bright segment is defined as the segment whose number of pixel values greater than threshold TH_HI or TH_LO is greater than the threshold TH_CONF_PIX. The method of determining the bright segments in the input image IMG_I can be altered according to different applications and design concepts.

In the above example, the image converting module 10 divides the input image IMG_I into the segments SEG_11-SEG_mn and analyzes the input image IMG_I on the basis of the segments SEG_11-SEG_mn, to generate the specular map SM utilized for mapping the input image IMG_I of the low dynamic range to the intermediate image IMG_H of the high dynamic range and the confidence CONF utilized for adjusting the ratio between the intermediate image IMG_H and the input image IMG_I for generating the output image IMG_O. Because the information of the input image IMG_I is acquired by analyzing the segments SEG_11-SEG_mn rather than pixels in the input image IMG_I, the computing cost of analyzing the input image IMG_I is therefore decreased, so as to improve the power efficiency and reduce the manufacturing cost of the converting module 10.

According to different application and design concepts, those with ordinary skill in the art may observe appropriate alternations and modifications. In an example, the detecting unit 102 filters the pixel counts PC_HI_11-PC_HI_mn and PC_LO_11-PC_LO_mn before generating the specular map SM. For example, the detecting unit 102 may use an infinite impulse response (IIR) filter on each of the pixel counts PC_HI_11-PC_HI_mn and PC_LO_11-PC_LO_mn, to adjust the time domain stability of the pixel counts PC_HI_11-PC_HI_mn and PC_LO_11-PC_LO_mn. In addition, the detecting unit 102 may use a low pass filter on the pixel counts PC_HI_11-PC_HI_mn and PC_LO_11-PC_LO_mn corresponding to adjacent segments among the segments SEG_11-SEG_mn, to adjust the image stability among the pixel counts PC_HI_11-PC_HI_mn and PC_LO_11-PC_LO_mn.

Figure 5:
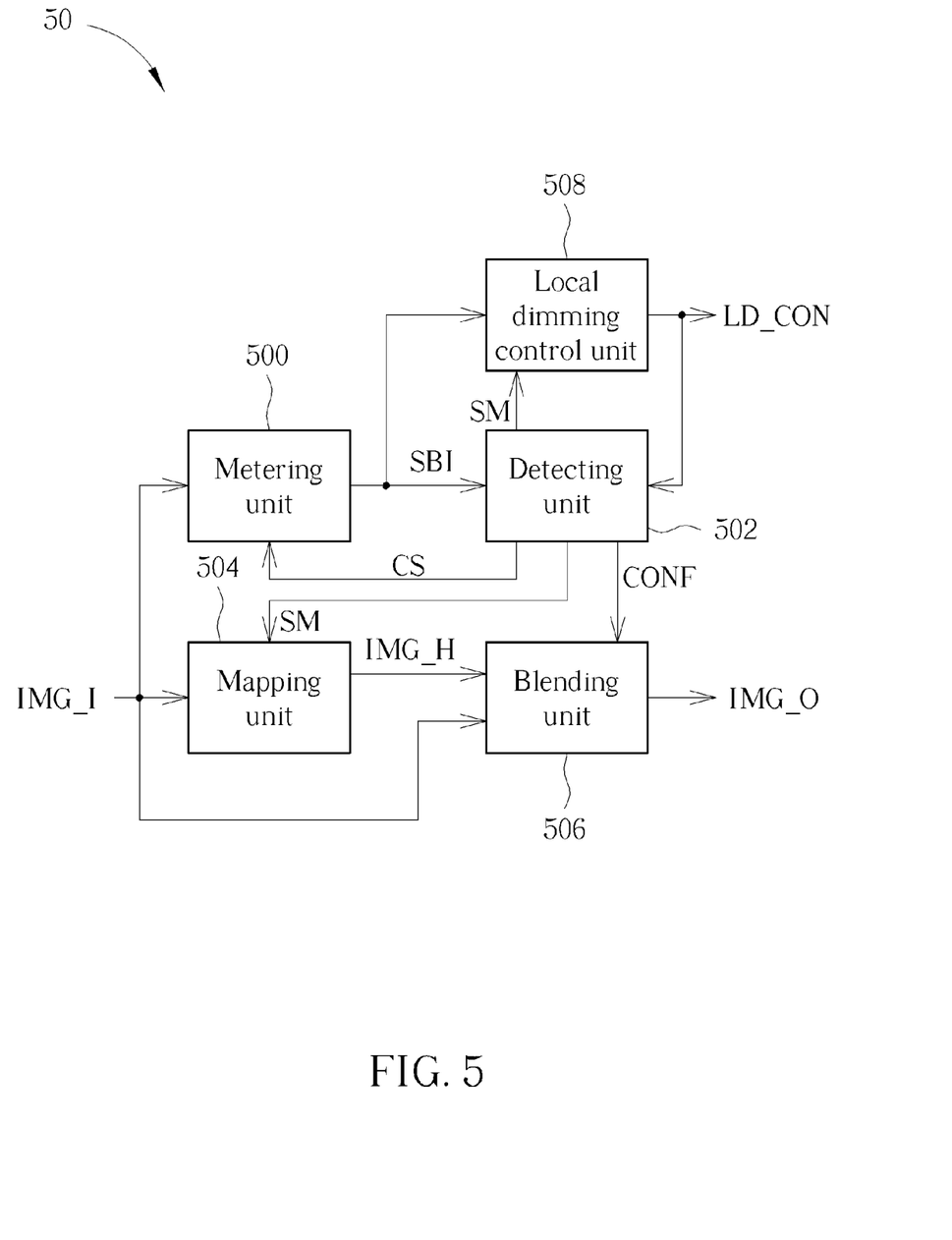
FIG. 5 is a schematic diagram of an image converting module according to an example of the present invention.

Please refer to FIG. 5, which is a schematic diagram of an image converting module 50 according to an example of the present invention. The Image converting module 50 is similar to the image converting module 10 shown in FIG. 1, thus the components and signals with the similar functions use the same symbols. The image converting module 50 may be utilized in a display device such as a LCD, a tablet, or a television, and is not limited herein. In FIG. 5, a local dimming control unit 508 is added in the image converting module 50, to generate a local dimming control signal LD_CON according to the segment information SBI and/or the specular map SM, wherein the local dimming control signal LD_CON is utilized to control backlight intensities BL_11-BL_mn of backlights in the display device. In addition, the detecting unit 102 may also acquire the local dimming control signal LD_CON and accordingly adjust the specular map SM. That is, the image converting module 50 not only adjusts the local dimming control signal LD_CON based on the segment based information SBI but also changes the specular map SM according to the local dimming control signal LD_CON.

In an example, the local dimming control unit 508 generates the local dimming control signal LD_CON according to the averages AVG_11-AVG_mn of the segments SEG_11-SEG_mn, the pixel counts PC_HI_11-PC_HI_mn, PC_LO_11-PC_LO_mn, the thresholds TH_HI, TH_LO, and/or the specular map SM. For example, the local dimming control unit 508 may adjust the backlight intensities BL_11-BL_mn of the backlights corresponding to segments SEG_11-SEG_mn according to the averages AVG_11-

AVG_mn of the segments SEG_11-SEG_mn. Because the averages AVG_11-AVG_mn represent the average brightness of the segments SEG_11-SEG_mn, the backlight intensities BL_11-BL_mn of the backlights corresponding to the segments SEG_11-SEG_mn are proportional to the averages AVG_11-AVG_mn, respectively.

In addition, the local dimming control unit 508 may use the pixel counts PC_HI_11-PC_HI_mn as the reference of generating the local dimming control signal LD_CON. When the pixel counts PC_HI_11-PC_HI_mn are greater, the number of pixel value exceeding the threshold TH_HI in each segment is greater. Thus, the local dimming control unit 508 makes the backlight intensity BL_ij of backlight corresponding to the segment SEG_ij proportional to the corresponding pixel counts PC_HI_ij, wherein i≤m and j≤n. The local dimming control unit 508 may further refer to the threshold TH_HI when adopting the pixel counts PC_HI_11-PC_HI_mn as the reference of generating the local dimming control signal LD_CON. The correlation between each of the pixel counts PC_HI_11-PC_HI_mn and the brightness of corresponding segment among the segments SEG_11-SEG_mn is more positive when the threshold TH_HI is greater. Thus, the local dimming control unit 508 increases the backlight intensities BL_11-BL_mn of the backlights corresponding to the segments SEG_11-SEG_mn based on the same pixel counts PC_HI_11-PC_HI_mn when the threshold TH_HI becomes greater.

In an example, the local dimming control unit 508 generates the local dimming control signal LD_CON according to the averages AVG_11-AVG_mn, the pixel counts PC_HI_11-PC_HI_mn, and the threshold TH_HI. The equations of the backlight intensities BL_11-BL_ij instructed by the local dimming control signal LD_CON can be expressed as:

$$BL\_ij = AVG\_ij \times (1-WGT) + TH\_HI \times WGT, i \le m \text{ and } j \le n \quad (6)$$

Figure 6:
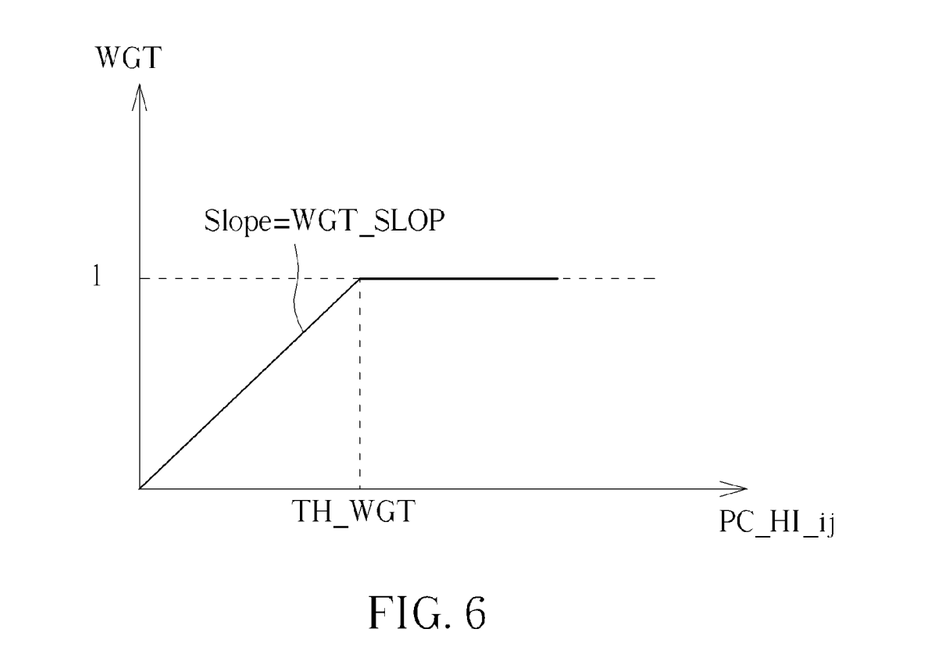
FIG. 6 is a schematic diagram of relationships between related signals of the image converting module shown in FIG. 5.

Wherein, WGT is proportional to the pixel count PC_HI_ij and the maximum of WGT is 1. Please refer to FIG. 6, which is a schematic diagram of relationship between WGT and the pixel count PC_HI_ij shown in equation (6). As shown in FIG. 6, WGT increases with the pixel count PC_HI_ij for a slope WGT_SLOP before reaching the maximum 1 and keeps at 1 when the pixel count PC_HI_ij is greater than a threshold TH_WGT. According to the equation (6) and FIG. 6, the local dimming control unit 508 adjusts the backlight intensities BL_11-BL_mn corresponding to segments SEG_11-SEG_mn according to the segment based information SBI.

In an example, the local dimming control unit 508 generates the local dimming control signal LD_CON according to the specular map SM. In this example, the backlight intensities BL_11-BL_mn instructed by the local dimming control signal LD_CON are proportional to the specular values SM_11-SM_mn, respectively. As a result, the contrast ratio of the display device is improved.

In an example, the detecting unit 502 adjusts the specular map SM according to the local dimming control signal LD_CON. Because the backlight intensities BL_11-BL_mn are proportional to the brightness of the segments SEG_11-SEG_mn, the detecting unit 502 adjusts the specular values SM_11-SM_mn according to the backlight intensities BL_11-BL_mn to make the specular values SM_11-SM_mn positively correlative with the backlight intensities BL_11-BL_mn. As a result, the contrast ratio of the display device is further improved.

Figure 7:
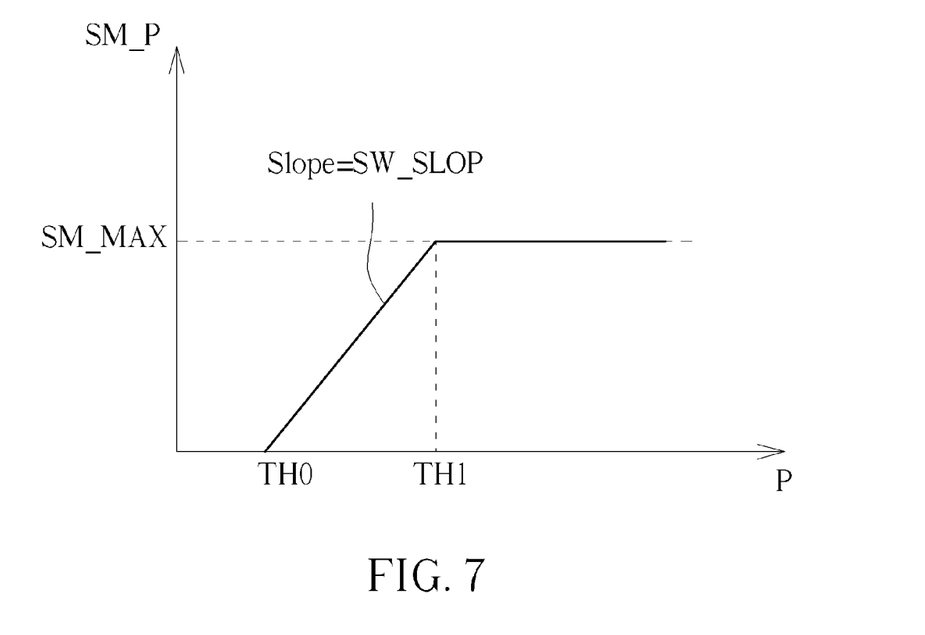
FIG. 7 is a schematic diagram of relationships between related signals of the image converting module shown in FIG. 1.

In an example, the detecting unit 102 directly generates the specular map SM_PIX without referring to the segment based information SBI. In this example, the image converting module 10 uses an edge preserved filter (e.g. a bilateral filter) to blur the input image IMG_I while preserving edge details in the input image IMG_I and accordingly acquires a filtered image IMG_F. Next, the detecting unit 102 generates the specular map SM according to pixel values of the filtered image IMG_F. Please refer to FIG. 7, which is a schematic diagram of relationship between a pixel value P in the filtered image IMG_F and the corresponded specular value SM_P of the specular map SM_PIX. As shown in FIG. 7, the specular value SM_P is 0 when the pixel value P is smaller than a threshold TH0, increases with the pixel value P at a constant slope SW_SLOP when the pixel value P is between the thresholds TH0 and TH1, and keeps at the maximum SM_MAX when the pixel value P is greater than the threshold TH1. According to the FIG. 7, the detecting unit 102 generates the specular map SM_PIX and the mapping unit 104 accordingly selects mapping curve of mapping each pixel value in the input image IMG_I to generate the intermediate image IMG_H of the high dynamic range. In this example, the confidence CONF is determined by a difference between the thresholds TH_HI and TH_LO, wherein the confidence CONF is proportional to the difference between the thresholds TH_HI and TH_LO. The blending unit 108 therefore can decide the ratio of blending the intermediate image IMG_H and the input image IMG_I and accordingly generate the output image IMG_O.

Figure 8:
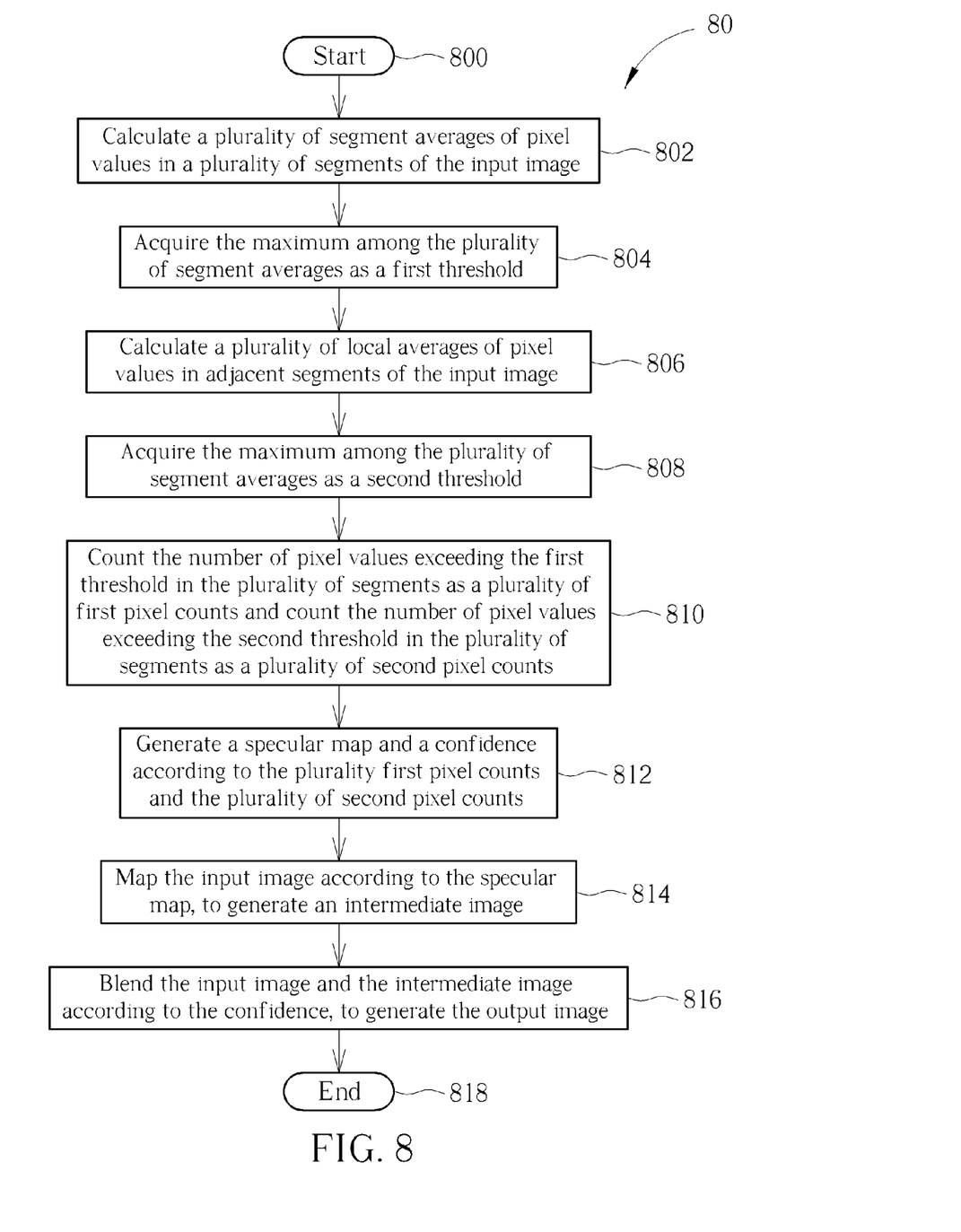
FIG. 8 is a flow chart of a process according to an example of the present invention.

The processes of the image converting module 10 and 50 converting the input image IMG_I with low dynamic range to the output image IMG_O with high dynamic range can be summarized into a process 80 shown in FIG. 8. The process 80 can be utilized in a display device, such as a TV, a LCD, or an electronic product with a display panel, to converts an input image with the low dynamic range of luminance or brightness to an output image with the high dynamic range of luminance or brightness. The process 80 comprises the following steps:

Step 800: Start.

Step 802: Calculate a plurality of segment averages of pixel values in a plurality of segments of the input image.

Step 804: Acquire the maximum among the plurality of segment averages as a first threshold.

Step 806: Calculate a plurality of local averages of pixel values in adjacent segments of the input image.

Step 808: Acquire the maximum among the plurality of segment averages as a second threshold.

Step 810: Count the number of pixel values exceeding the first threshold in the plurality of segments as a plurality of first pixel counts and count the number of pixel values exceeding the second threshold in the plurality of segments as a plurality of second pixel counts.

Step 812: Generate a specular map and a confidence according to the plurality first pixel counts and the plurality of second pixel counts.

Step 814: Map the input image according to the specular map, to generate an intermediate image.

Step 816: Blend the input image and the intermediate image according to the confidence, to generate the output image.

Step 818: End.

According to the process 80, the input image is divided into a plurality of segments, wherein each of the plurality segments comprises multiple pixels of the input images. The average pixel values in the plurality of segments are acquired as a plurality of segment averages and the average pixels values in adjacent segments among the plurality of segments are acquired as a plurality of local averages. In an example, each of the plurality of local averages is corresponding to adjacent segments forming a rectangular matrix (e.g. 2*2 matrix). The maximum among the plurality of segment averages is defined as a first threshold and the maximum among the plurality of local averages is defined as a second threshold. After acquiring the first threshold, the number of pixel values exceeding the first threshold in each of the plurality segments is counted, to generate a plurality of first pixel counts. Similarly, the number of pixel values exceeding the second threshold in each of the plurality segments is counted, to generate a plurality of second pixel counts.

According to the plurality of first pixel counts and the plurality of second pixel counts, a specular map and a confidence are generated. In an example, each specular value in the specular map corresponding to the plurality segments is proportional to the first pixel count and the second pixel count corresponding to the same segment. In addition, the confidence is generated by calculating the ratio between the number of the segments with a sum of the first pixel count and the second pixel count exceeding a confidence threshold among the plurality of segments and the total number of the plurality of segments. Next, the input image is mapped according to the specular map, to generate an intermediate image of the high dynamic range of luminance or brightness. In an example, the specular values in the specular map are interpolated to generate the interpolated specular values corresponding to pixels of the input image, and the mapping curves of mapping pixel values of the input image are selected according to the interpolated specular values.

Finally, the output image is generated by blending the input image and the intermediate image. The ratio between the input image and the intermediate image for generating the output image is determined by the confidence generated according to the plurality of first pixel counts and the plurality of second pixel counts. Because the information of converting the input image to the output image is acquired by analyzing the plurality of segments rather than pixel values in the input image, the computing cost of converting the input image to the output image is reduced. The power efficiency is improved and manufacturing cost is reduced, therefore. Note that, the information of the plurality of segments (e.g. the segment averages, the local averages, the first threshold, the second threshold, the first pixel counts, or the second pixel counts) or the specular map also can be utilized to adjust backlight intensities of backlights configured in the display device. The detailed operations of the process 80 can be referred to the above descriptions and are not narrated herein for brevity.

Please note that, the above mentioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), computer on module (COM), and the image converting modules 10 and 50.

To sum up, the image converting modules of the above example converts the input image with the low dynamic range to the output image with the high dynamic range by analyzing the information of the segments rather than pixels of the input image. The computing cost is therefore decreased. In addition, the analyzed information of segments can be utilized in controlling the backlight intensities of the display device. The contrast ratio of the display device is further improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image converting method for a display device, comprising:
   calculating, by a computing module of the display device, a plurality of segment averages of pixel values in a plurality segments of an input image of a low dynamic range of luminance;
   acquiring, by the computing module of the display device, the maximum among the plurality of segment averages as a first threshold;
   calculating, by the computing module of the display device, a plurality of local averages of pixel values in adjacent segments of the input image;
   acquiring, by the computing module of the display device, the maximum among the plurality of local averages as a second threshold;
   counting, by the computing module of the display device, the number of pixel values exceeding the first threshold in the plurality of segments as a plurality of first pixel counts and counting the number of pixel values exceeding the second threshold in the plurality of segments as a plurality of second pixel counts;
   generating, by the computing module of the display device, a specular map and a confidence according to the plurality of first pixel counts and the plurality of second pixel counts;
   mapping, by the computing module of the display device, the input image according to the specular map, to generate an intermediate image of a high dynamic range of luminance;
   blending, by the computing module of the display device, the input image and the intermediate image according to the confidence, to generate an output image, wherein the ratio between the input image and the intermediate image is determined by the confidence, and
   displaying, by the display device, the output image.

2. The image converting method of claim 1, wherein the specular map comprises a plurality of specular values corresponding to the plurality of segments and each of the plurality of specular values is proportional to at least one of the first pixel counts and the second pixel counts corresponding to the same segment.

3. The image converting method of claim 2, wherein a first specular value corresponding to a first segment is calculate by the following equations:

$$SM\_itmp = (PC\_HI + PC\_LO) \times (PC\_HI + 1)$$

$$\text{first specular value} = \text{MIN}(SM\_tmp \times SPE\_SLOP, SM\_MAX)$$

wherein, PC_HI is the first pixel count of the first segment, PC_LO is the second pixel count of the first segment, SM_MAX is a predetermined maximum value of the plurality of specular values, and SPE_SLOP is a coefficient of adjusting relationships among the first specular value, PC_HI and PC_LO.

4. The image converting method of claim 1, wherein the step of generating, by the computing module of the display device, the confidence according to the plurality first pixel counts and the plurality of second pixel counts comprises:
summing, by the computing module of the display device, the plurality of first pixel counts and the plurality of second pixel counts corresponding to the same segment, to acquire a plurality of sums;
dividing, by the computing module of the display device, the number of sums exceeding a confidence threshold by the number of the plurality of segment, to acquire a confidence ratio; and
generating, by the computing module of the display device, the confidence according to the confidence ratio.

5. The image converting method of claim 4, wherein the confidence is generated by:

$$\text{confidence} = \begin{cases} \text{C\_MAX}, & \text{SPE\_RA} \leq \text{TH\_RA} \\ \text{C\_MAX} - \text{MIN}((\text{SPE\_RA} - \text{TH\_RA}) \times \text{SPE\_RA\_Slop}, \text{C\_MAX}), & \text{SPE\_RA} > \text{TH\_RA} \end{cases}$$

wherein, C_MAX is a predetermined maximum value of the confidence, TH_RA is the confidence threshold.

6. The image converting method of claim 1, wherein the step of mapping, by the computing module of the display device, the input image according to the specular map to generate the intermediate image comprises:
interpolating, by the computing module of the display device, a plurality of specular values of the specular map, to generate a plurality of pixel specular values corresponding to pixel values of the input image;
interpolating, by the computing module of the display device, a plurality of mapping curves according to the plurality of pixel specular values, to generate a plurality of pixel mapping curves corresponding to the pixel values of the input image; and
utilizing, by the computing module of the display device, the plurality of pixel mapping curves to map the pixel values of the input image, to generate the intermediate image.

7. The image converting method of claim 1, further comprising:
adjusting, by the computing module of the display device, a plurality of backlight intensities of backlights, which are configured in the display device and corresponding to the plurality of segments, according to at least one of the plurality of segment averages, the plurality of first pixel counts, the plurality of second pixel counts, the first threshold, the second threshold and the specular map.

8. The image converting method of claim 7, wherein a first backlight intensity of a first segment is calculated by:

first backlight intensity=AVG×(1−WGT)+TH_HI× WGT wherein AVG is the segment average of the first segment, TH_HI is the first threshold, and WGT is a value proportional to the first pixel count of the first segment.

9. The image converting method of claim 7, further comprising:
adjusting, by the computing module of the display device, the specular map according to the plurality of backlight intensities.

* * * * *